US012333523B2

(12) United States Patent
Abdelrahman et al.

(10) Patent No.: US 12,333,523 B2
(45) Date of Patent: Jun. 17, 2025

(54) SYSTEMS AND METHODS FOR CONTEXTUAL TRANSACTION DATA COLLECTION USING LARGE LANGUAGE PROCESSING

(71) Applicant: U.S. Bancorp, National Association, Minneapolis, MN (US)

(72) Inventors: Ahmed Abdelrahman, Dallas, TX (US); Samuel Assefa, Watertown, MA (US); Charles Engdahl, Minneapolis, MN (US); Andrew Garner, State Road, NC (US); David Ridgway, Harleysville, PA (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 222 days.

(21) Appl. No.: 18/227,675

(22) Filed: Jul. 28, 2023

(65) Prior Publication Data

US 2025/0037107 A1    Jan. 30, 2025

(51) Int. Cl.
*G06Q 20/34* (2012.01)
*G06Q 20/20* (2012.01)
(Continued)

(52) U.S. Cl.
CPC ............. *G06Q 20/34* (2013.01); *G06Q 20/20* (2013.01); *G06Q 20/389* (2013.01);
(Continued)

(58) Field of Classification Search
CPC ...... G06Q 20/34; G06Q 20/20; G06Q 20/389; G10L 15/183; G10L 15/22; H04N 23/64
(Continued)

(56) References Cited

U.S. PATENT DOCUMENTS 7,657,473 B1 *  2/2010  Meffie ................... G06Q 40/00
                                                        235/379
11,694,227 B1 *  7/2023  Belanger ............ G06Q 30/0255
                                                        705/14.49
(Continued)

OTHER PUBLICATIONS

Yin, "AI Technology and Online Purchase Intention: Structural Equation Model Based on Perceived Value", Sustainability 13.10: 5671, MDPI AG, May 18, 2021.*

(Continued)

*Primary Examiner* — Frantzy Poinvil
(74) *Attorney, Agent, or Firm* — FOLEY & LARDNER LLP

(57) ABSTRACT

A mobile electronic device includes a network interface and one or more processors coupled to memory. The one or more processors can be configured to receive a message comprising transaction data regarding a transaction and a request regarding activating a chat application stored in the memory; the chat application, wherein the chat application is configured to execute a large language model using the transaction data and account data as input to generate a first string of text requesting further data regarding the transaction; present the first string of text at a chat interface of the chat application; receive additional transaction data; execute the large language model using the additional transaction data as input to generate a second string of text indicating storage of the additional data in a record; and present the second string of text at the chat interface.

20 Claims, 10 Drawing Sheets

(51) Int. Cl.
  *G06Q 20/38* (2012.01)
  *G10L 15/183* (2013.01)
  *G10L 15/22* (2006.01)
  *H04N 23/60* (2023.01)
(52) U.S. Cl.
  CPC ............ *G10L 15/183* (2013.01); *G10L 15/22* (2013.01); *H04N 23/64* (2023.01)
(58) Field of Classification Search
  USPC .......................................................... 705/39
  See application file for complete search history.

(56) References Cited

U.S. PATENT DOCUMENTS

| | | | |
|---|---|---|---|
| 11,783,432 B1* | 10/2023 | Haas | G06Q 40/12 705/30 |
| 2013/0144785 A1* | 6/2013 | Karpenko | G06Q 20/425 705/44 |
| 2013/0191213 A1* | 7/2013 | Beck | G06Q 30/0207 705/14.64 |
| 2013/0325681 A1* | 12/2013 | Somashekar | H04M 15/851 705/35 |
| 2023/0230091 A1* | 7/2023 | Vaughn | G06Q 20/4016 705/71 |
| 2024/0126575 A1* | 4/2024 | Kiriakou | G06F 9/451 |

OTHER PUBLICATIONS

Corchado et al., "Generative Artificial Intelligence Fundamentals", ADCAIJ: Advances in Distributed Computing and Artificial Intelligence Journal, Regular Issue, vol. 12. N. 1 e31704 (Year: 2023).*

* cited by examiner

500

Bank Text: Your Bank premier credit card was used at Store A in Elkin NC at 4:30 ET on 12/20/22 in the amount of $89.55. Would you like to add a Memo or Instructions? If Yes, respond: V for voice, T for text. If No respond: N
　　User responds: V
Money Memo (MM) app with Smart Assistant is opened with voice: "what would you like to do"
　　User speaks: Set expense category to "Home Office Supplies"
MM app speaks: "That category is not set up. Would you like to add it?"
　　User speaks: "yes"
MM app speaks: MM app speaks: "Category set up and expense recorded. Would you like to add a personal memo?
　　User speaks "yes"
MM app speaks: "Record your memo"
　　User speaks: "Laser Printer toner cartridge"
MM app speaks: "Your memo is recorded. Would you like something else?"
　　User speaks: "No"
MM app speaks: Your Transaction and memo are recorded in the budget tracking section of the Memo log under My Transactions. Thank you for using Money Memo."

Bank Text: Your Bank premier credit card was used at Store A in Elkin NC at 4:30 ET on 12/20/22 in the amount of $312.55. Would you like to add a Memo or Instructions? If Yes, respond: V for voice, T for text. If No respond: N
  User responds: V
Money Memo (MM) app with Smart Assistant is opened with voice: "what would you like to do"
  User speaks: "Record expense category for full amount"
MM app speaks: "What category would you like to use?"
  User speaks: "Home office equipment"
MM app speaks: "Expense recorded to Home Office equipment. Would you like to add a personal memo?
  User speaks: "Yes"
MM app speaks: "Record your memo"
  User speaks: "HP Laser Jet X1250 with 4-year warranty
MM app speaks: "would you like to attach a photo of the receipt?
  User speaks: "NO"
MM app speaks: Category and MEMO are recorded in the budget tracking Memo log under My Transactions. Thank you for using Money Memo."
  User later receives an email with a copy of the receipt which they file in their documents file folder. User opens Money Memo app, locates the transaction in their MEMO transaction log and attaches the file of the receipt to the logged transaction.

Bank Text: Your Bank premier credit card was used at Store A in Elkin NC at 4:30 ET on 12/20/22 in the amount of $312.55. Would you like to add a Memo or Instructions? If Yes, respond: V for voice, T for text. If No respond: N
    User responds: V
Money Memo (MM) app with Smart Assistant is opened with voice: "what would you like to do"
    User speaks: "Record expense category for full amount"
MM app speaks: "What category would you like to use?"
    User speaks: "Home office equipment"
MM app speaks: "Expense recorded to Home Office equipment. Would you like to add a personal memo?
    User speaks: "Yes"
MM app speaks: "Record your memo"
    User speaks "HP Laser Jet X1230 with 4-year warranty.
MM app speaks: "would you like to attach a photo of the receipt?
    User speaks "Yes, multiple pages"
MM app opens camera app and speaks: "align receipt in the window with top at the indicated location and snap"
    User snaps and reviews the photo of receipt –speaks: "Photo is good. Next photo"
MM app opens camera app and speaks: "align receipt in the window with top at the indicated location and snap"
    User snaps and reviews the photo of the warranty–speaks: "Photo is good. Also record transaction and photos in Warranties"
MM app speaks: All Photos of your receipt and warranty are recorded in the transaction tracking section and warranty tracking section of the Memo log under My Transactions. Thank you for using Money Memo."

Bank Text: Your Bank premier credit card was used at Store A in Elkin NC at 4:30 ET on 12/20/22 in the amount of $93.75. Would you like to add a Memo or Instructions? If Yes, respond: V for voice, T for text. If No respond: N
  User responds: V
Money Memo (MM) app with Smart Assistant is opened with voice: "what would you like to do"
  User speaks: Record expense in Multiple categories"
MM app speaks: "What is your first category and amount" and shows top choices on screen (one is groceries)
  User speaks: "groceries with Amount "$58.55"
MM app speaks: "What is your next category, and amount-you have $35.20 remaining" and shows Prescription RX, non-RX medicine, health care, merchandise, custom, etc.
  User speaks: "custom - for remaining balance"
MM app speaks: What category name do you want to create (max 50 characters)?
  User speaks: "Charitable contributions with a receipt"
MM app speaks "we recorded your new category- "Charitable contributions with a receipt' and allocated the balance of $35.00. Would you like to add a personal memo?"
  User speaks "yes"
MM app speaks: "Record your memo"
  User speaks: "Contribution was for Elkin 1st United Methodist church to fund school supplies for the local school December backpack drive."
MM app speaks: "would you like to attach a photo of the receipt?
  User speaks "Yes"
MM app opens camera app and speaks: "align receipt in the window with top at the indicated location"
  User snaps and reviews the photo --speaks: "Photo is good. This is all I need"
MM app speaks: Photo of your receipt is recorded in the receipt tracking section of the Memo log under My Transactions. Thank you for using Money Memo."

Bank Text: Your  Bank premier FREELANCE credit card was used at  Store A  in Elkin NC at 4:30 ET on 12/20/22 in the amount of $108.80. Would you like to add a Memo or Instructions? If Yes, respond: V for voice, T for text. If No respond: N
    User responds: V
Money Memo (MM) app with Smart Assistant is opened with voice: "what would you like to do"
    User speaks: "Record expense in Multiple Freelancer categories"
MM app speaks: "What is your first category and amount" and shows top choices of business expenses on screen (one option is office supplies)
    User speaks: "Category is "business-office supplies" with AMOUNT of "$58.55" and MEMO—"office supplies used on John Taylor Job" – also record the expense under Category -Business Tax-office supplies"
MM app speaks: "What is your next category, and amount-you have $50.25 remaining" and displays Business-Photo Services, Custom, etc.
    User speaks: "Category is "business-photo services- with Amount 35.00 and MEMO —wall posters  for the Andy Capp job" also record the expense under Category- business tax– photo services"
MM app speaks "What is your next category, and amount-you have $15.25 remaining and shows personal expense categories and options groceries, medicine, office supplies, etc."
    User speaks "personal-groceries with AMOUNT 15.25 and "MEMO —discretionary food"
MM app speaks: "You have $0.0 remaining; would you like to attach a photo of the receipt?"
    User speaks "Yes"
MM app opens camera app and speaks: "align receipt in the window with top at the indicated location"
    User snaps and reviews the photo –speaks: "Photo is good. This is all I need"
MM app speaks: Photo of your receipt is recorded in the business and personal receipt tracking sections of the Memo log under My Transactions. Thank you for using Money Memo."

FIG. 9

Money Memo (MM) app with Smart Assistant is opened with voice: "what would you like to do"
User speaks: Capture Cash expense
MM app speaks: "Who did you pay?"
User speaks: "Elkin NC    Charity A   "
MM app speaks: "What Amount and Category would you like to use?
User speaks: "$20.00 with Category Contribution-Cash Out of Pocket"
MM app speaks: "$20.00 Contribution-Cash Out of Pocket paid to Elkin NC Charity A   ". Would you like to add a personal memo?
User speaks: "No"
MM app speaks: "Would you like anything else?"
User speaks: "Also record the transaction in the personal taxes folder. That is all"
MM app speaks: "Transaction is recorded in the budgeting AND Personal Tax tracking sections of the Memo log under My. Have a nice day"

SYSTEMS AND METHODS FOR CONTEXTUAL TRANSACTION DATA COLLECTION USING LARGE LANGUAGE PROCESSING

BACKGROUND

With the increase in digital transactions and transactions at brick-and-mortar establishments, it has become crucial to have efficient and user-friendly methods to manage and monitor these transactions. Many financial institutions offer mobile applications that allow for account management, transaction reviews, and expenditure categorization. However, these applications often rely on standard user interfaces where the user needs to manually navigate through different application sections to complete a transaction or request.

Further, the traditional methods used by these applications to categorize transactions or request additional transaction data can be inefficient. It often requires the user to manually enter or select appropriate information. This process can be time-consuming and prone to errors, especially if the user is unfamiliar with the system.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 5-10 are example conversations for example scenarios of communication between a user and one or more computing devices regarding a transaction, in accordance with an implementation.

DETAILED DESCRIPTION

Figure 1:
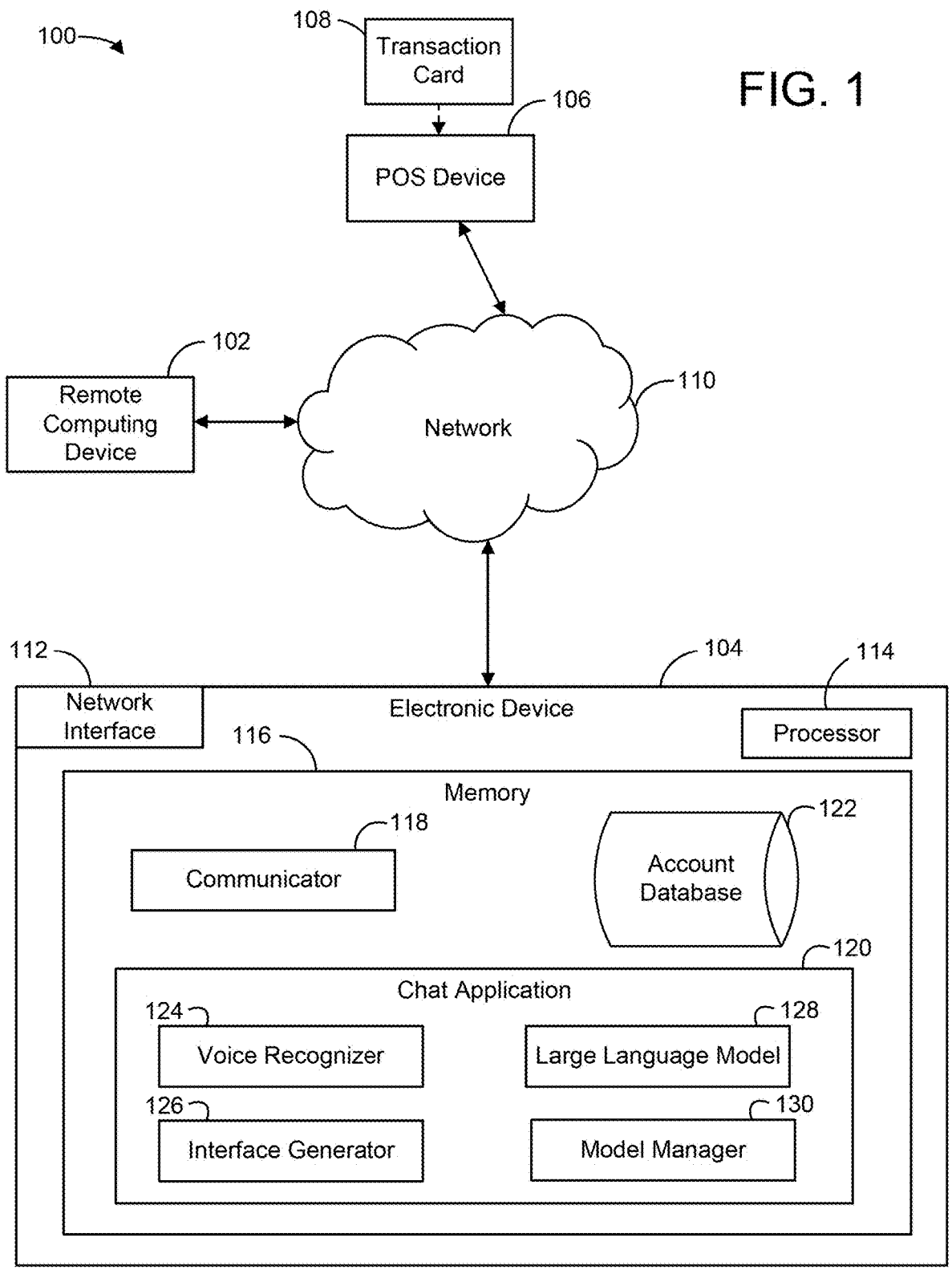
FIG. 1 is an illustration of an example system for using large language processing for contextual transaction data collection, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As previously mentioned, interfaces to manage transactions often require manual navigation through different menus and/or user interfaces to provide financial institutions with data regarding the transactions. While some applications implement chatbot technology to facilitate user communication and information retrieval, these applications often use predefined scripts or responses, limiting the flexibility and natural language capabilities of their interactions. Moreover, a need exists for an application that allows for seamless integration of transaction data and a chat interface, enabling real-time, accurate, and user-friendly handling of transactions.

A computer (e.g., a mobile electronic computing device) implementing the systems and methods described herein can overcome the aforementioned technical deficiencies. For example, the computer may store a chat application in memory that is configured to maintain a chat interface to communicate with a user of the computer. The computer can activate the chat application responsive to receiving a message indicating the user has completed a transaction (e.g., an online transaction or a transaction at a brick-and-mortar store). The user can communicate with the chat application by typing or speaking different inputs into the chat interface maintained by the chat application. The chat application can input the communication by the user into a large language model that has been trained to automatically generate output text based on such inputs. The chat application can execute the large language model with each input to request further data regarding the transaction, to request actions to perform, and/or to indicate a status of the transaction. The user and the large language model can communicate with each other in this manner until the chat application (e.g., through the large language model) determines the conversation is complete and/or that enough data has been collected by the chat application. The large language model can generate and present a text string indicating the conversation is complete at the chat interface to end the communication feed regarding the transaction with the user.

In one example, the chat application can execute the large language model to collect contextual information regarding a transaction performed by a user of the computer. For example, via the chat interface, the user can provide an input that indicates a category of the transaction and/or any other information regarding the transaction. The large language model can receive the input category and automatically determine a response to the user based on the category, such as a request for further information or an indication that the transaction data for the transaction will be stored under the category. The chat application, in some cases by executing the large language model, can operate to send a message to a remote computing device that includes an indication of the category for the transaction as input by the user. The user can input any such information into the chat interface. The chat application can send the input data to the remote computing device for storage with the transaction data for the transaction and/or the computer can store the input data with the transaction data in local memory. Accordingly, the large language model can enable the chat application to collect contextual information regarding a transaction to store with transaction data of the same transaction. Such contextual data can later be used for data analytics and/or retrieved for presentation to the user.

An embodiment of the technical solution described herein provides a method and a mobile electronic device that can use a chat application and a large language model to process, request, and present transaction data for different transactions. This system can enhance the user experience by offering a more interactive and natural communication interface, which can significantly streamline the transaction management process. The chat application can use a large language model to generate contextually relevant messages using transaction data and account data of the user, allowing for a more conversational interaction that can promptly handle user requests and present necessary information in a clear and easy-to-understand format.

FIG. 1 illustrates an example system 100 for using large language processing for contextual transaction data collection, in some embodiments. In brief overview, the system 100 can include a remote computing device 102 and an electronic device 104. The remote computing device 102 can be configured to store transaction data regarding transactions performed by different individuals. The remote computing device 102 can receive an indication of a completed transaction and/or transaction data of the completed transaction from a point-of-sale (POS) device 106. The transaction may have been performed through a transaction card 108. The remote computing device 102 can transmit the transaction data for the transaction to the electronic device 104 and the electronic device 104 can execute a large language processing model to receive contextual information regarding the transaction from a user of the electronic device 104. The electronic device 104 can transmit the contextual information to the remote computing device 102 for storage. The remote computing device 102, the electronic device 104, and/or the POS device 106 can communicate over a network 110. The system 100 may include more, fewer, or different components than shown in FIG. 1.

The remote computing device 102, the electronic device 104, and/or the POS device 106 can include or execute on one or more processors or computing devices and/or communicate via the network 110. The network 110 can include computer networks such as the Internet, local, wide, metro, or other area networks, intranets, satellite networks, and other communication networks such as voice or data mobile telephone networks. The network 110 can be used to access information resources such as web pages, websites, domain names, or uniform resource locators that can be presented, output, rendered, or displayed on at least one computing device (e.g., the remote computing device 102, the electronic device 104, and/or the POS device 106), such as a laptop, desktop, tablet, personal digital assistant, smartphone, portable computers, or speaker.

The remote computing device 102, the electronic device 104, and/or the POS device 106 can include or utilize at least one processing unit or other logic devices such as a programmable logic array engine or a module configured to communicate with one another or other resources or databases. As described herein, computers can be described as computers, computing devices, or client devices. The remote computing device 102 and/or the POS device 106 may each contain a processor and a memory. The components of the remote computing device 102, the electronic device 104, and/or the POS device 106 can be separate components or a single component. The system 100 and its components can include hardware elements, such as one or more processors, logic devices, or circuits.

The POS device 106 can be a computing device that is associated with a particular location (e.g., an entity or merchant). For example, the POS device 106 can be a point-of-sale device that collects data (e.g., transaction data) regarding different transactions that are performed at the POS device 106 or can receive transaction data from other POS devices (e.g., the POS device 106 can operate in the cloud and process online transactions and/or transactions that are performed at local brick-and-mortar stores). The POS device 106 can be a computing device that operates at a financial institution or a brick-and-mortar building. For example, the POS device 106 can include a register at a brick-and-mortar store or a server in the cloud that facilitates transactions for online stores. The POS device 106 can be configured to receive a request for an item purchase in a transaction. In some cases, such transactions can be performed by the transaction card 108. The transaction card 108 can be a card that is connected to an account stored at the remote computing device 102 and can be configured to perform transactions (e.g., perform transactions using near-field communication technology or swiping technology). The POS device 106 can identify attributes of items (e.g., value, item type, number of items, etc.) and/or other attributes of transactions (e.g., time of the transaction, geographical location of the transaction, type of the transaction (e.g., online or at a brick-and-mortar store), the merchant of the transaction, the total value of the transaction, etc.). The POS device 106 can transmit the attributes (e.g., transaction attributes) of the transactions as transaction data and/or identifiers of accounts (e.g., an identifier of the transaction card that was used to initiate the transaction) to the remote computing device 102 or to another computing device that transmits or forwards the data to the remote computing device 102.

The remote computing device 102 can be a server or computer that is configured to store transaction data regarding transactions that are performed through different accounts. The remote computing device 102 can store ledgers (e.g., tables) for different accounts in memory (e.g., in a database in memory). Each ledger can be a data structure that stores data for transactions. Each account can include a general ledger in which all transaction data of all transactions performed through the account are stored and/or transaction category ledger in which only transaction data of transactions labeled under the same transaction category are stored. In some cases, the ledger can include sub-ledgers. For instance, a ledger can store ledger of a certain type (e.g., budgeting, business, personal, tax, etc.) that correspond to subledgers for different transaction categories. The remote computing device 102 can store any number of ledgers for any number of accounts in memory.

The accounts for which the remote computing device 102 stores ledgers and transaction data can include profile data. The profile data can include identifiers of electronic devices that correspond to the different accounts and/or identifiers of transaction cards that correspond to the different accounts. The remote computing device 102 can store transaction data for transactions in the accounts based on the identifiers of the transaction cards that performed the transaction matching identifiers in the respective accounts.

For example, an individual may use the transaction card 108 to perform a transaction through the POS device 106. The individual can do so, for instance, by swiping the transaction card 108 or by inputting a card identifier (e.g., a numerical or alphanumerical value) of the transaction card 108 into a browser to complete a transaction through the POS device 106. The POS device 106 can transmit any transaction data that the POS device 106 generates and/or detects for the transaction to the remote computing device 102 with the card identifier of the transaction card 108. The remote computing device 102 can compare the card identifier of the transaction card 108 with card identifiers of transaction cards of the accounts stored in memory (e.g., in the database). The remote computing device 102 can identify an account with a matching card identifier to the transaction card 108. The remote computing device 102 can retrieve an identifier (e.g., a phone number or email address) associated with the electronic device 104 from the identified account. The remote computing device 102 can transmit a message (e.g., a push notification or email) containing the transaction data for the transaction performed by the transaction card 108 to the electronic device 104 using the identifier associated with the electronic device.

The electronic device 104 can be a mobile electronic computing device (e.g., a cellular phone, a laptop, or a tablet or any other computing device that is configured to be transported and used at different locations). The electronic device 104 can include a display with a microphone, a speaker, a keyboard, a touchscreen and/or any other input/output device. A user can view applications that are executing on the electronic device 104 on the display and/or provide inputs via the input/output devices of the electronic device 104.

The electronic device 104 may comprise one or more processors that are configured to provide a chat interface that a user can use to add contextual data for a transaction to a record of transaction data that the remote computing device 102 stores for the transaction. The electronic device 104 may comprise a network interface 112, a processor 114, and/or memory 116. The electronic device 104 may communicate with the remote computing device 102 via the network interface 112, which may be or include an antenna or other network device that enables communication across a network and/or with other devices. The processor 114 may be or include an ASIC, one or more FPGAs, a DSP, circuits containing one or more processing components, circuitry for supporting a microprocessor, a group of processing components, or other suitable electronic processing components. In some embodiments, the processor 114 may execute computer code or modules (e.g., executable code, object code, source code, script code, machine code, etc.) stored in memory 116 to facilitate the activities described herein. The memory 116 may be any volatile or non-volatile computer-readable storage medium capable of storing data or computer code.

The memory 116 may include a communicator 118, a chat application 120, and/or an account database 122, in some embodiments. In brief overview, the chat application 120 may cooperate to generate and/or maintain a chat interface at a display of the electronic device and/or through which a user can provide voice data. Through the chat interface, a user of the electronic device 104 can input data regarding the transaction performed through the transaction card 108. The chat application 120 can use large language processing techniques to determine responses based on the transaction data of the transaction and, in some cases, account data of an account associated with the user. Upon completing the interaction with the user and collecting contextual information regarding the transaction through the chat interface, the electronic device 104 can transmit the contextual information to the remote computing device 102 to store in a record (e.g., a file, document, table, listing, message, notification, etc.) with the other transaction data of the transaction.

The communicator 118 may comprise programmable instructions that, upon execution, cause the processor 114 to communicate with the remote computing device 102 and/or any other computing device. The communicator 118 may be or include an application programming interface (API) that facilitates communication between the electronic device 104 (e.g., via the network interface 112) and other computing devices. The communicator 118 may communicate with the remote computing device 102 and/or any other computing device across the network 110.

The communicator 118 can establish a connection with the remote computing device 102. The communicator 118 can establish the connection with the remote computing device 102 over the network 110. To do so, the communicator 118 can communicate with the remote computing device 102 across the network 110. In one example, the communicator 118 can transmit a syn packet to the remote computing device 102 and establish the connection using a TLS handshaking protocol. The communicator 118 can use any handshaking protocol to establish a connection with the remote computing device 102.

The chat application 120 may comprise programmable instructions that, upon execution, cause the processor 114 to generate a chat interface and communicate with a user of the electronic device 104 through the chat interface. The chat application 120 can additionally communicate and/or control other applications stored in the memory 116 of the electronic device 104. For example, the chat application 120 can automatically activate a camera application stored in the memory 116 responsive to receiving a request at the chat interface to take a picture. The chat application 120 can operate or control any applications stored in the memory 116 of the electronic device 104.

The chat application 120 can include a voice recognizer 124, an interface generator 126, a large language model 128, and a model manager 130. The components 124-130 can operate to maintain a chat interface through which a user of the electronic device 104 can provide inputs and the components 124-130 can operate to provide outputs based on the inputs. The components 124-130 can automatically process the inputs to generate text string responses to images and/or text strings that are provided into the chat interface. In doing so, the components 124-130 can collect additional transaction data regarding transactions, store the additional transaction in the account database 122, and/or transmit the additional transaction data to the remote computing device 102. The components 124-130 can do so without relying on predefined templates or complicated user interfaces for the communication.

The processor 114 can activate the chat application 120. The processor 114 can activate the chat application 120 in response to receiving the message from the remote computing device 102 regarding the transaction performed by the transaction card 108. For example, the electronic device 104 can receive the message containing transaction data for the transaction through the communicator 118. In response to receiving the message, the processor 114 can activate (e.g., open) the chat application 120 to access a user interface provided by the chat application 120.

In some cases, the processor 114 activates the chat application 120 responsive to receiving a user input. For example, the electronic device 104 can receive the message from the remote computing device 102 and display the data (e.g., the transaction data) of the message in a push notification. A user accessing the electronic device 104 can select a button (e.g., a hyperlink) in the push notification. The processor 114 can receive the selection and automatically open or activate the chat application 120 responsive to receiving the selection.

Upon opening or activating the chat application 120, the interface generator 126 of the chat application 120 can generate and/or present a user interface of the chat application 120. The interface generator 126 can comprise programmable instructions that, upon execution, cause the processor 114 to generate a user interface of the chat application 120. The user interface can include a form or an input portion or the user can navigate the user interface to such a form or input portion. The form or input portion can be located on a chat interface of the chat application 120. The user can provide text, video, or image input into the form or input portion of the user interface. In some cases, the electronic device 104 can receive audio recordings and the chat application 120 can automatically translate the audio records into text. The chat application 120 can input the translated text into the chat interface.

The voice recognizer 124 may comprise programmable instructions that, upon execution, cause the processor 114 to convert audio into text. For example, the user of the electronic device 104 can speak into a microphone of the electronic device. The microphone can capture the speech as audio data and transmit the audio data to the chat application 120. The voice recognizer 124 can convert the speech into text, such as by using Fourier transforms. The voice recognizer 124 can cluster and classify words of the text to generate a prompt or input to insert into the large language model 128.

In some embodiments, the voice recognizer 124 only operates upon the user of the electronic device 104 choosing to provide inputs to the chat interface via a voice option. The message to the electronic device 104 from the remote computing device 102 may include a string of text asking whether the user wishes to use voice or text to provide input into the chat application 120. The user may respond to the message (e.g., send a message, such as a text message, back to the remote computing device 102) with an indication to use voice to provide input into the chat application 120. The indication may be, for example, the letter "v." The electronic device 104 can transmit the message containing the indication to the remote computing device 102. The remote computing device 102 can transmit a message back to the electronic device 104 that causes the processor 114 to activate the chat application 120 and generate a voice chat interface through which the chat application 120 can receive inputs from the user via the microphone of the electronic device 104.

In some embodiments, the electronic device 104 can generate the voice chat interface locally. For example, the electronic device 104 can display the contents of the message from the remote computing device 102 in a push notification. The user can select the push notification or an option within the push notification to access the chat application 120. Upon doing so the user can access the chat application 120 and select an option to use voice to provide an input into the chat application 120. Upon receiving the selection, the interface generator 126 can configure the chat application 120 to receive audio data from the microphone of the electronic device 104 through a chat interface. The voice recognizer 124 can convert the audio data into text and insert the text into the large language model 128.

The large language model 128 can be a machine learning model (e.g., neural network, a transformer, etc.) that has been trained to output conversational text to a chat interface of the chat application 120 in response to inputs at the chat interface. The large language model 128 can be trained using few-shot and/or zero-shot learning techniques.

In some embodiments, the large language model 128 can be trained to output responses to inputs regarding transactions. For example, the large language model 128 can receive a notification to generate an output based on a transaction. In response to the notification, the large language model 128 can automatically output a request for an action to perform, in some cases based on transaction data of a transaction (e.g., the time of the transaction, the location of the transaction, the amount of the transaction, etc.). The large language model 128 can output the request as a string of text to the chat interface for display on the electronic device 104. In some embodiments, the large language model 128 can output the request as a string of text to a text-to-speech converter (e.g., the voice recognizer 124). The text-to-speech converter can convert the text into audio data. The electronic device 104 can play audio data through speakers of the electronic device 104. The large language model 128 can receive a response to the request either as a text input into the chat interface or as audio input into the chat interface and automatically generate a new string of text based on the response. The large language model 128 can iteratively repeat this process to maintain a conversation with the user through the chat interface of the chat application 120.

In some embodiments, the large language model 128 is stored at the remote computing device 102. For example, the electronic device 104 can communicate or otherwise establish a communication session with the remote computing device 102. The electronic device 104 can receive inputs from a chat interface generated by the interface generator 126. The electronic device 104 can transmit the inputs as text in messages to the remote computing device 102. The remote computing device 102 can input the text into the large language model 128 stored in memory of the remote computing device 102 and execute the large language model 128. The large language model can generate responses to the inputs as text. The remote computing device 102 can transmit the responses to the electronic device 104. The electronic device 104 can present the responses to the user at the chat interface as text or audio data. The user can view or hear the responses and provide further input based on the responses. The electronic device 104 can iteratively repeat this process to maintain a conversation between the user and the large language model 128.

The model manager 130 may comprise programmable instructions that, upon execution, cause the processor 114 to provide inputs into the large language model 128, execute the large language model 128, and identify outputs of the large language model 128. For example, the user of the electronic device 104 can speak into a microphone of the electronic device 104. The microphone can capture the speech as audio data and transmit the audio data to the chat application 120. The voice recognizer 124 can convert the speech into text, such as by using Fourier transforms. The voice recognizer 124 can cluster and classify words of the text to generate a prompt (e.g., a feature vector of input data) or input to insert into the large language model 128. The model manager 130 can execute the large language model 128 based on such inputs to cause the large language model 128 to output responses to the prompts or inputs.

The model manager 130 can facilitate a conversation between the large language model 128 and a user accessing the electronic device 104 regarding the transaction performed by the transaction card 108. For example, the user can select an option in a push notification displayed on the display of the electronic device 104 (or send a text message response to the message from the remote computing device 102) to add additional transaction data for the transaction. In response to the selection by the user, the processor 114 of the electronic device 104 can activate or open the chat application 120. The interface generator 126 can generate a chat interface through which the user can provide text or voice input, in some cases based on a selection by the user. The model manager 130 can input the transaction of the transaction into the large language model 128. The model manager 130 can execute the large language model 128. The large language model 128 can output a text response requesting further data regarding the transaction based on the input transaction data. The model manager 130 can display or play the text response for the user through the chat interface.

The large language model 128 can generate the text response requesting further data regarding the transaction based on the transaction data for the transaction. For example, the large language model 128 may generate requests for certain types of data based on the time and/or day of the transaction. For instance, the large language model 128 may generate a text confirming that the transaction occurred at Store A when the transaction data does not include an identification of the location of the transaction but includes a time of the transaction and the large language model 128 may have previously received and/or been trained on transaction data indicating that the user shops at Store A at the time of the transaction or within a time range of the time of the transaction. In another example, the large language model 128 may request data that the user may have provided in one or more transactions with similar transaction data to the transaction performed by the transaction card 108. For instance, the user may have requested to store additional notes regarding transactions that the user performed on consecutive Tuesdays. The transaction data for the transaction may include an identification that the transaction was performed on a Tuesday. The large language model 128 may identify the identification that the transaction was performed on a Tuesday and automatically ask (e.g., generate a string of text with a question for) the user whether the user wishes to provide additional notes regarding the transaction. In another example, the large language model 128 may detect a change in purchasing behavior and request a reason for the change in behavior or request confirmation that the transactions are not fraudulent. In another example, the large language model 128 may determine that there is not a category (e.g., a budget category or a type of purchase category) for the transaction in the transaction data and request that the user provide a category for the transaction. The large language model 128 can generate the requests or responses as text strings and request any type of data.

In some cases, the large language model 128 can request actions that the user would like to be performed. For example, the large language model 128 can ask the user what action the user would like performed or ask the user if the user requires any other action. In some cases, the large language model 128 can ask the user whether the user would like specific actions performed, such as whether the user would like to capture and/or store an image of a receipt or if the user would like to generate a memorandum or notes regarding a transaction. The large language model 128 can request such actions based on transaction data of transactions and/or automatically responsive to an indication to initiate a conversation at the chat interface (e.g., the large language model 128 may automatically ask the user what action to perform responsive to activation of the chat application 120).

In some embodiments, the model manager 130 can input account data associated with the transaction card 108 with the transaction data for the transaction into the large language model 128. For example, the account database 122 can be a graph or relational database. The account database 122 can be a data structure that stores data regarding one or more accounts (e.g., financial accounts). The account database 122 can store ledgers with records of different transactions performed by the accounts. The accounts can include identifiers of different transaction cards that perform transactions for the respective accounts. The account database 122 can also store other data (e.g., account data) regarding the accounts, such as categories of transactions performed through the respective accounts, budgets for the respective accounts and/or for different categories of the respective accounts, timestamps of the respective transactions, any other transaction data of the respective transactions, etc. The account database 122 can store any type of data for respective accounts.

The account database 122 can be located at the electronic device 104 and/or the remote computing device 102. In cases in which the account database 122 is stored at the electronic device 104, the account database 122 can be configured to store data for an account associated with the transaction card 108 and data for no other account, in some cases. The electronic device 104 can update the account database 122 with transaction data for different transactions performed by the transaction card 108 or any other card associated with the account or another account of the account database 122 responsive to receiving the transaction data (e.g., receiving the transaction data from the remote computing device 102). In cases in which the account database 122 is stored at the remote computing device 102, the account database 122 can store data for any number of accounts. The remote computing device 102 can update the account database 122 with transaction data for different transactions performed through the accounts of the account database 122 as the remote computing device 102 receives and processes such transaction data.

The model manager 130 can use account data of an account associated with the transaction card 108 as input into the large language model 128. For example, the model manager 130 can retrieve account data, such as a remaining budget or a remaining budget for the same category of the transaction, from the account database 122 (e.g., from the account database 122 stored in memory 116 or the account database 122 stored in memory of the remote computing device 102). The model manager 130 can retrieve any type of account data regarding the account associated with the transaction card 108 from the account database 122. In cases in which the account database 122 is stored at the remote computing device, the model manager 130 can retrieve the account data by requesting the account data from the remote computing device 102 or the remote computing device 102 can automatically transmit the account data to the electronic device 104. The model manager 130 can generate an input including the transaction data for the transaction performed by the transaction card 108 and the account data and insert the generated input into the large language model 128. The model manager 130 can execute the large language model 128 to cause the large language model 128 to output a text string (e.g., a first text string) in a response to the input.

The text string output by the large language model 128 can be or include a request for further data regarding the transaction. In one example, the text string output by the large language model can be or include a request for a category of the transaction. For instance, the transaction data for the transaction may include data regarding a time, a location, and/or an amount of the transaction, but not a category of the transaction. Account data that may be included with the transaction data may indicate that the account has budgets for different categories (e.g., transaction categories) of transactions, such as recreational, automotive, groceries, etc. The large language model 128 may receive such transaction data and, in some cases, account data, and output a string asking for a category of the transaction. The model manager 130 can present the string of text at the chat interface (e.g., present the text at the user interface generated by the interface generator 126 and/or play audio of the string of text through a speaker of the electronic device 104.

The user accessing the electronic device 104 can view or hear the string of text (e.g., as audio data of the string of text). In response, the user can input (e.g., by typing or speaking) a category for the transaction into the chat interface as additional transaction data. The model manager 130 can receive and identify the transaction category for the transaction from the chat interface.

The model manager 130 can execute the large language model 128 using the transaction category for the transaction as input. The large language model 128 can determine the transaction category is a continuation of the previous input transaction data and/or account data for a transaction using internal rules. In response to receiving the transaction category for the transaction, in response to determining that the transaction category is a continuation of the previous input transaction, and/or in response to determining not to request any further transaction data, the large language model 128 can store the transaction category in the account database 122 (e.g., in the memory 216 and/or at the remote computing device 102) in a record with other transaction data of the same transaction. For example, the model manager 130 can transmit a message (e.g., a second message) to the remote computing device 102 that includes the additional transaction data (e.g., a category of the transaction), an identification of the transaction (e.g., a transaction number), and/or the identifier of the transaction card 108 to the remote computing device 102. The remote computing device 102 can receive the message and store the additional transaction data in a record with any other transaction data of the transaction on a ledger associated with the account of the transaction card 108. The ledger can include one or more other records of transactions performed by the transaction card. The large language model 128 can generate and output a string of text (e.g., a second string of text) indicating that the additional transaction data has been stored in a record. The model manager 130 can identify the string of text and present the string of text at the chat interface of the chat application.

In some cases, the computer (e.g., the remote computing device 102 or the electronic device 104) storing the account database 122 can store the transaction data in a ledger of the account of the transaction card 108 that corresponds to the transaction category of the transaction (e.g., the transaction category that the chat application 120 receives through the chat interface). For example, the remote computing device 102 can receive the transaction category for the transaction and/or transaction data for the transaction. The remote computing device 102 can identify the account of the transaction card 108 based on the account having a matching card identifier to the transaction card 108. The remote computing device 102 can compare the transaction category for the transaction to ledgers for different transaction categories that the account database 122 stores for the account using a look-up technique. Responsive to identifying a ledger associated with the transaction category (e.g., that contains a matching transaction category identification), the remote computing device 102 can store the transaction data for the transaction in the ledger of the account with the transaction category of the transaction.

In some cases, the account may not include a ledger for a transaction category that is included in data from the electronic device 104. For example, the remote computing device 102 can query the account database 122 for a ledger for the account of the transaction performed by the transaction card 108 that corresponds to a transaction category received from the electronic device 104. Based on the query, the remote computing device 102 can determine there is not a ledger for the account that corresponds to the transaction category. In response to the determination, the remote computing device 102 can generate a data structure (e.g., a table) comprising a ledger for transactions associated with the transaction category in the account database 122. The remote computing device 102 can store the transaction data for the transaction in the ledger of the generated data structure.

The model manager 130 can iteratively generate strings of text as the user provides inputs into the chat interface. For example, in some cases, the large language model 128 can request more transaction data regarding the transaction with the subsequently generated string of text instead of or in addition to indicating the additional transaction data has been stored in memory. Such transaction data can be a secondary category of the transaction, a time of the transaction, a location of the transaction, and/or any other data regarding the transaction (e.g., data that was not included in the transaction data and/or account data that was initially input into the large language model 128). The user can input the requested text and/or input any other data into the chat interface to cause the large language model 128 to generate a response. This process can repeat until the large language model 128 determines the conversation is over, such as based on the most recently received input (e.g., an input such as "nothing further" or "thank you"). The chat application 120 can store any transaction data regarding the transaction that the chat application 120 receives through the chat interface in the account database 122.

In some cases, the large language model 128 can be configured to operate other applications in the memory 116 of the electronic device 104. For example, the large language model 128 can receive a request to store an image of a document (e.g., a receipt) for the transaction performed by the transaction card 108. In response to receiving the request, the large language model 128 can automatically activate a camera application in memory of the electronic device 104. The camera application can include executable instructions that, upon execution, cause the processor 114 to operate a camera of the electronic device 104. The user accessing the electronic device 104 can provide an input into the camera application to cause the camera of the electronic device 104 to capture an image of the document. The chat application 120 can store the image of the document in the record for the transaction in the account database 122 and/or transmit the image of the document to the remote computing device 102 to store the image in the record for the transaction in the account database 122. The model manager 130 can execute the large language model 128 using the request to store the image as input. In response, the large language model 128 can output a string of text (e.g., a third string of text) indicating the image has been stored. The model manager 130 can present the string of text at the chat interface of the chat application.

In some embodiments, the model manager 130 can input data of the image of the document into the large language model 128. For example, the model manager 130 can input the image of the document into an object detection machine learning model (e.g., a neural network, such as a convolutional neural network) and execute the object detection machine learning model. In response to the execution, the object detection machine learning model can automatically identify text and/or objects in the image (e.g., the text in the receipt, such as the specific items that were purchased and/or the prices of such items). The object detection machine learning model can output text indicating or describing the text and/or objects. The model manager 130 can identify the output of the object detection machine learning model and input the output of the object detection machine learning model into the large language model 128. The model manager 130 can execute the large language model 128 and the large language model 128 can output a text string based on the input data of the image. In some cases, the text string can indicate the specific items that were purchased, amounts for the items, and/or any other characteristics for the items. The chat application 120 can store the output and/or any extracted data from the image with the transaction data in the record of the account database 122.

In one example of using account data to generate output text responses, at initiation, the chat application 120 may predict most probable next action(s) based on the prior receipt of a delivery notice for a store in the location proximity of the user or an indication that no real time transaction notice is pending. The chat application 120 may determine the probable initial action based on prior stores visited by the user of the account and the transaction history or the lack of prior data. The chat application 120 can perform categorization by predicting the most probable categories or new category suggestions based on location, date, time, stores in proximity, last transactions in the proximity, categories/types used and the recorded use of splitting and multi-association of transaction allocations. The chat application 120 determine when to request receipt capture based on location/store type and amount plus prior transaction info known for this location/store and recorded receipt categories/types used and the recorded use of splitting and multi-association of transaction allocations. The chat application 120 can determine when to request personal memos based on location/store type and amount plus prior transaction info known for this location/store and recorded receipt categories/types used and the recorded use of splitting and multi-association of transaction allocations as well as the use and content of prior memos. The chat application 120 can analyze free form, unstructured memos for key phrases and words so that content, importance, and potential additional actions can be tagged/labeled and extracted. The chat application 120 can analyze conversational instructions for potential needed next actions or to extract specific instructions to be taken so that the most probable action can be confirmed conversationally. The chat application 120 can perform one or more of such functions through the large language model 128 to generate output text prompts. In doing so, the chat application can use account data of the account through which the transaction was performed, transaction data of the transaction, and/or any user-provided input.

Figure 2:
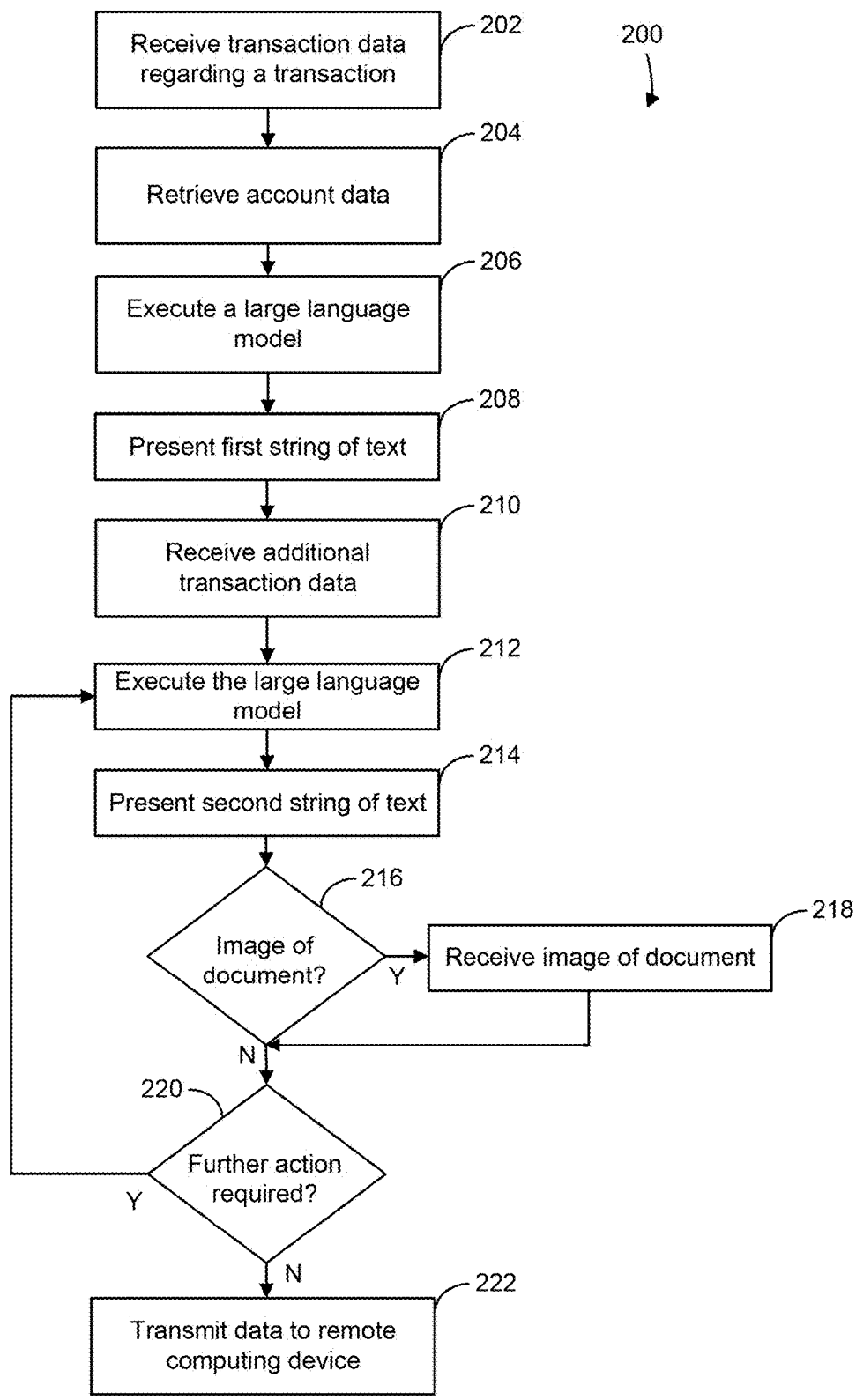
FIG. 2 is an illustration of an example method for using large language processing for contextual transaction data collection, in accordance with an implementation.

FIG. 2 is an illustration of an example method 200 for using large language processing for contextual transaction data collection, in accordance with an implementation. The method 200 can be performed by a data processing system (e.g., a client device or the electronic device 104, shown and described with reference to FIG. 1, a server system, etc.). The method 200 may include more or fewer operations and the operations may be performed in any order. Performance of the method 200 may enable the data processing system to provide an accessible user interface to collect contextual data for transactions. The method 200 can enable a large language model to collect such contextual data and integrate with other applications stored on the same computing device as the large language model. Using a large language learning model in this manner can enable the data processing system to enrich transaction data for transactions that the data processing system has stored in memory via an interactive and natural communication interface.

In the method 200, at operation 202, the data processing system receives transaction data regarding a transaction. The transaction can be performed by a transaction card. The transaction can be a transaction performed at a brick-and-mortar store such as at a point-of-sale device or can be an online transaction. The transaction data can include any data regarding the transaction, such as a time, location, and/or amount of the transaction. In some cases, the transaction data can include a card identifier of the transaction card that was used to perform the transaction and/or an identification of the transaction itself.

The data processing system can receive the transaction data in a message from a remote computing device (e.g., the remote computing device 102). The data processing system can receive the transaction data via a communications network such as via e-mail or via a text message. The data processing system can present the contents of the message (e.g., the transaction data) at a user interface of the data processing system. A user accessing the data processing system can provide an input indicating to add additional transaction data to the transaction data and, in some cases, a method of adding the additional transaction data (e.g., using voice or text).

At operation 204, the data processing system retrieves account data. The account data can be data of an account that corresponds to the transaction card that performed the transaction. The account data can include historical transaction data of previous transactions that the transaction card or the account was used to perform, a remaining budget or a remaining budget for the transaction category of the transaction, or any other data of an account. The data processing system can retrieve the account data by querying a local database or by requesting the account data from the remote computing device that transmitted the initial message to the data processing system for the transaction. The data processing system can query the database and/or include the identifier of the transaction card that performed the transaction in the message to the remote computing device to retrieve the account data. The remote computing device can transmit the account data back to the data processing system or the data processing system can retrieve the account data from the database.

At operation 206, the data processing system executes a large language model. The large language model can be a language processing model that is configured to automatically generate text output based on text input that the large language model receives. The data processing system can input the transaction data for the transaction performed by the transaction card with the account data into the large language model. The large language model can generate and/or output a first string of text based on the input and the execution. The first string of text can be a request for further data regarding the transaction (e.g., a request for a transaction category of the transaction or any other data regarding the transaction that is not included in the transaction data (e.g., time, location, and/or amount)).

At operation 208, the data processing system presents the first string of text. The data processing system can present the first string of text at a chat interface. The data processing system can do so, for example, by presenting the text on a display or playing audio of the first string of text after the data processing system converts the first string of text into audio. The data processing system can select the method of presenting the first string of text based on an option selected by the user of the data processing system. The user accessing the data processing system can view or hear the content of the first string of text.

At operation 210, the data processing system receives additional transaction data. The additional transaction data can be any transaction data regarding the transaction performed by the transaction card. The additional transaction data can be or include a transaction category for the transaction, an image of a receipt for the transaction, or any other data for the transaction that the user provides as input. The data processing system can receive the additional transaction data as a text input into the data processing system via an input/output device or based on the user speaking into a speaker of the data processing system.

At operation 212, the data processing system executes the large language model. The data processing system can execute the large language model using the additional transaction data as input. The large language model can determine the additional transaction data is a continuation of the initial input transaction data and account data using a set of internal rules. The data processing system can execute the large language model based on the additional transaction data and the large language model can generate a second string of text. In some cases, the data processing system can store the transaction data and additional transaction data in a record in memory or transmit the transaction data and additional transaction data to the remote computing device for storage. In some cases, the second string of text can ask the user if there is any further data to include with the transaction data or if any further action is required. At operation 214, the data processing system presents the second string of text at the chat interface.

At operation 216, the data processing system determines the user has provided an input requesting to include an image of a document (e.g., a receipt) for the transaction. For example, the user can provide one or more further inputs into the chat interface to use as input into the machine learning model. The data processing system can execute the large language model using each of the inputs from the user as inputs into the large language model to generate text responses. The data processing system can repeat this process any number of times.

In one example, the user may input text indicating to include an image of a document (e.g., a receipt) for the transaction. The data processing system can input the request to include the image into the large language model and execute the large language model. In response to execution, the large language model can activate a camera application on the data processing system. The user can capture an image of the document using the camera application through a camera of the data processing system. At operation 218, the data processing system can receive the image from the camera application. The data processing system can receive an input into the chat interface indicating that the image is good and/or to store the image. In response to such an input, the data processing system can store the image within the record with the transaction data and/or transmit the image to the remote computing device and the remote computing device can store (e.g., attach) the image with a record of the transaction data.

At operation 220, the data processing system can determine whether further action is required. The data processing system can do so based on a user input at the chat interface. For example, the large language model can generate a text output asking if any other further action is required. Responsive to receiving an input at the chat interface indicating that further action is required and/or a type of the action, the data processing system can return to the operation 212 and repeat the operations 212-220. The data processing system can repeat the operations 212-220 any number of times such that the data processing system can collect any amount of data regarding the transaction and/or perform any action regarding the transaction.

Responsive to receiving an input at the chat interface indicating further action is not required, at operation 222, the data processing system transmits data to the remote computing device. The data processing system can transmit any data regarding the transaction to the remote computing device in a message. The data processing system can include the identification of the transaction in the message and/or the card identifier of the transaction card that was used to perform the transaction in the message. The data processing system can include any images that were input regarding the transaction in the message. The remote computing device can receive the message and identify or extract any data from the message. The remote computing device can generate a record from the extracted data including any other transaction data that the remote computing device had stored for the transaction (which the remote computing device may identify based on the transaction identification and/or the card identifier of the transaction card). The remote computing device can store the record in memory.

In some cases, the data received through the chat interface can include a category of the transaction. In such cases, the remote computing device can identify a ledger in memory for the account associated with the transaction card that corresponds with the category of the transaction. The data processing system can store the record in the identified ledger.

In some embodiments, the data processing system can additionally or instead generate and/or store a record in memory for the transaction data. The data processing system do so in the same or a similar manner to the manner described above with respect to the remote computing device. In such embodiments, the data processing system may store records of transactions performed by the transaction card.

Figure 3:
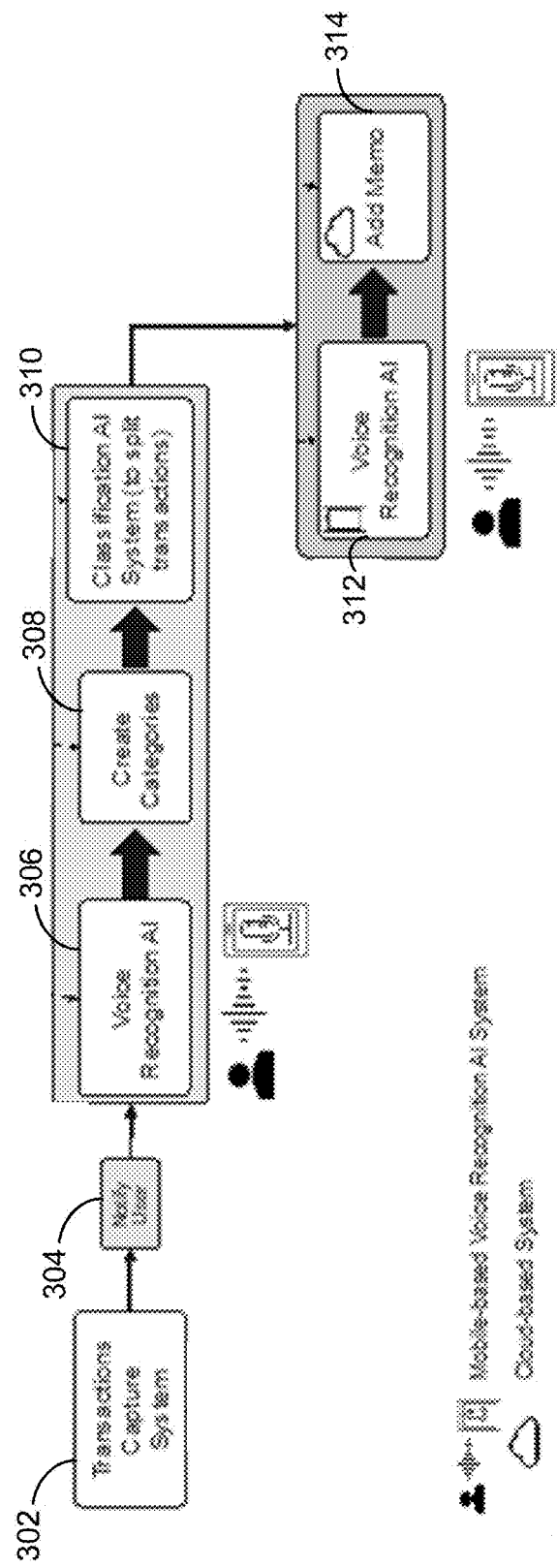
FIG. 3 is an illustration of an example sequence for using large language processing for contextual transaction data collection, in accordance with an implementation.

FIG. 3 is an illustration of an example sequence 300 for using large language processing for contextual transaction data collection, in accordance with an implementation. The sequence 300 can be performed by one or more components of the system 100. For example, different operations of the sequence 300 can be performed by one or more of a remote computing device (e.g., the remote computing device 102) or an electronic device (e.g., the electronic device 104). The sequence 300 can be performed to facilitate a user using voice inputs to add contextual data to a transaction.

At operation 302, the remote computing device can identify a transaction performed by a transaction card. The remote computing device can be a transaction capture system that is configured to identify and/or store transaction data for transactions upon completion of the transactions. The remote computing device can be or include an artificial intelligence system that uses a machine learning model (e.g., a neural network, a random forest, a support vector machine, etc.) that has been trained to automatically detect transactions that are performed at brick-and-mortar stores and/or online. The remote computing device can communicate with a data warehouse to retrieve data related to such transactions. In some embodiments, the machine learning model can be a deep learning system that includes one or more neural networks that cooperate to recognize, capture, and categorize the transactions. The machine learning model can categorize transactions into the types of stores or websites at which the transactions are performed. The machine learning model may not be able to extract or determine the category of the transaction without any user input.

The remote computing device can identify a transaction (e.g., the remote computing device can receive an indication of a transaction from a point-of-sale device and/or the data warehouse with any transaction data for the transaction and/or the remote computing device can retrieve transaction from the data warehouse responsive to receiving an indication of the transaction). The remote computing device can execute the machine learning model to determine a category of the type of store or website at which the transaction was performed from the transaction data of the transaction.

At operation 304, the remote computing device can transmit a notification of the transaction to an electronic computing device. The remote computing device can transmit the notification of the transaction to the electronic computing device in a message. The remote computing device can include the transaction data for the transaction in the message. The message can include the transaction data in a text format. The text can indicate to the user of the electronic device that the remote computing device is ready to receive additional transaction data (e.g., purchase details) regarding the transaction and assist the user in organizing spending for future purchases. The electronic device can display the text at a user interface to the user. The user can select an option to provide additional transaction data. In some cases, the user can provide an input indicating to provide the additional data via a voice input.

At operation 306, the electronic device can execute a voice recognition artificial intelligence system to process data received from the user. The electronic device can do so responsive to the user providing an input at the electronic device to provide additional transaction data for the transaction. The voice recognition artificial intelligence system can use deep learning techniques for voice recognition. The voice recognition artificial intelligence system can convert the user's voice into text and execute a natural language model procedure to cluster the text (e.g., words) and classify the clusters of text (e.g., classify the clusters based on or more characteristics based on which the words of the text were clustered).

At operation 308, the electronic device can execute a categorizer machine learning model. The categorizer machine learning model can be a neural network, support vector machine, random forest, etc., that is configured to categorize text generated by the voice recognition artificial intelligence system or otherwise received as input by the electronic device. The categorizer machine learning model can be trained to classify user commands, such as assigning a transaction category to a transaction. For example, when a user command is to create a transaction category of grocery for a transaction, the categorizer machine learning model can create a data object or tag identifying the transaction category of grocery for the transaction.

At operation 310, the electronic device can execute a classification model to assign the transaction category (e.g., the data object or tag) to the transaction. The classification model can combine the transaction data for the transaction with the transaction category to identify and classify the transaction category of the transaction. The classification model can combine the transaction data and the transaction category into a common data file. The data file can be a memorandum (memo). The electronic device can collect and combine any type or amount of additional transaction data for the transaction.

The electronic device can execute a large language model based on the transaction data and the input additional transaction data. The large language model can include or be in communication with one or more of the categorizer machine learning model and/or the classification model. The large language model can generate text indicating the additional transaction data has been successfully combined (e.g., combined into the common data file). The large language model can display the text at a user interface displayed at the electronic device or the electronic device can convert the text into audio and play the audio to the user. The user can provide an input (e.g., text or voice input) indicating confirmation that no further action is needed. If the user provides the input as voice data, at operation 312, the voice recognition artificial intelligence system can convert the voice data to text data and the categorizer machine learning model and classification model can operate to determine no further action is needed.

At operation 314, the electronic device can transmit the combined file to the remote computing device to store in memory in a record. The remote computing device can include an identifier of the transaction in the record that can be used to look up the transaction data and/or additional transaction data of the transaction.

Figure 4:
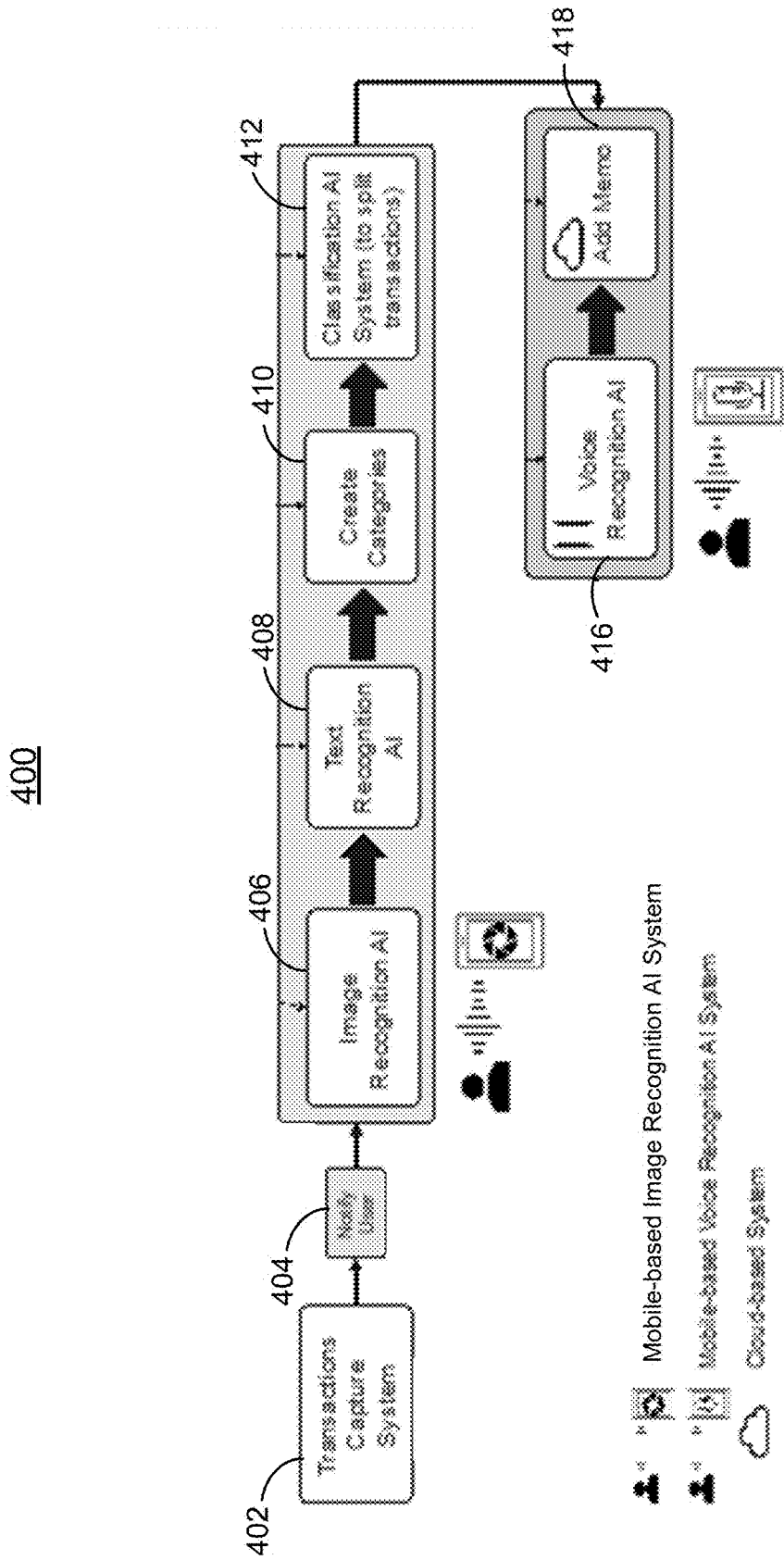
FIG. 4 is an illustration of an example sequence for using large language processing for contextual transaction data collection, in accordance with an implementation.

FIG. 4 is an illustration of an example sequence 400 for using large language processing for contextual transaction data collection, in accordance with an implementation. The sequence 400 can be performed by one or more components of the system 100. For example, different operations of the sequence 400 can be performed by one or more of a remote computing device (e.g., the remote computing device 102) or an electronic device (e.g., the electronic device 104). The sequence 400 can be performed to facilitate a user using image inputs to add contextual data to a transaction.

At operation 402, the remote computing device can identify a transaction performed by a transaction card. At operation 404, the remote computing device can transmit a notification of the transaction to an electronic computing device. The remote computing device can perform the operations 402 and 404 in the same manner as described above with respect to the operations 302 and 304.

At operation 406, the electronic device can execute an image recognition artificial intelligence system (e.g., an object detection machine learning model configured to extract or identify objects in images) to process an image received from the user. The image can be an image received of a document (e.g., a receipt) associated with the transaction. The electronic device can execute the image recognition artificial intelligence system responsive to the user providing an input at the electronic device to add an image as additional transaction data for the transaction and capturing and/or otherwise providing the image as input into the object detection machine learning model. The electronic device can capture the image using a camera of the electronic device or the user can otherwise upload the image to the electronic device. The electronic device can execute the image recognition artificial intelligence system and the image recognition artificial intelligence system can output text or other objects that the image recognition artificial intelligence system identifies or otherwise classifies from the image.

In some cases, instead of extracting data from an image of the document, the electronic device can receive data of a receipt or a similar document for the transaction in a text message or an email from a computer of the merchant at which the transaction was performed. The electronic device can match the data of the transaction from the merchant based on the message containing a matching transaction identifier to the transaction for which the electronic device is adding data (e.g., a matching transaction identifier to the transaction identifier the electronic device received from the remote computing device).

At operation 408, the electronic computing device can execute a text recognition artificial intelligence system. The text recognition artificial intelligence system can execute a natural language model procedure to cluster the text (e.g., words) and classify the clusters of text (e.g., classify the clusters based on or more characteristics based on which the words of the text were clustered).

At operation 410, the electronic device can execute a categorizer machine learning model. The categorizer machine learning model can be the same categorizer machine learning model as is described above with respect to the operation 308. The categorizer machine learning model can execute the categorizer machine learning model using text (e.g., the clustered text) from the document for the transaction and/or voice or text from the user as input. In some cases, the categorizer machine learning model can be configured or trained to automatically determine (e.g., based on internal weights or parameters of the machine learning model) a transaction category for the transaction from the text of the document. The categorizer machine learning model can output a transaction category for the transaction based on the user input text or voice data and/or data of the image of the document for the transaction.

At operation 412, the electronic device can execute a classification model to assign the transaction category (e.g., the data object or tag) to the transaction. The classification model can combine the transaction data for the transaction with the transaction category and/or image of the document. The transaction category and/or image can be additional transaction data. The classification model can combine the transaction data, the transaction category, and/or the image of the document into a common data file. The data file can be a memorandum. The electronic device can collect and combine any type or amount of additional transaction data for the transaction.

If the user provides an input as voice data, at operation 414, a voice recognition artificial intelligence system (e.g., the same or a similar voice recognition artificial intelligence system as described above) can convert the voice data to text data and the categorizer machine learning model and classification model can operate to determine no further action is needed.

At operation 416, the electronic device can transmit the combined file to the remote computing device to store in memory in a record. The remote computing device can include an identifier of the transaction in the record that can be used to look up the transaction data and/or additional transaction data of the transaction.

FIGS. 5-10 are example scenarios 500-1000 of communication between a user and one or more computing devices regarding a transaction, in accordance with an implementation. Each of the scenarios 500-100 can be performed, for example, by a user accessing an electronic device (e.g., a mobile electronic device) subsequent to performing a transaction and/or while the user is walking back to their vehicle from the store through which the transaction was performed. The electronic device can store and execute a chat application containing a large language model to communicate with the user.

In the scenario 500, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to set the transaction category of the transaction to "Home Office Supplies." The electronic device can determine (e.g., through the large language model of the electronic device using an adapter) the account of the user or transaction does not currently have a ledger or any indication for the input category, such as by querying the remote device or by querying a database stored in memory and determining the account does not have any data regarding the transaction category. In response to the determination, the large language model can generate text indicating the transaction category does not exist and ask the user if the user would like to create a ledger for the transaction category. The electronic device can ask the user if the user would like to add any further additional transaction data for the transaction, such as by asking if the user would like to add a personal memo. The user can reply with a "yes" input and the electronic device can output instructions for the user to add the additional transaction data. The user can input the additional data. The electronic device can request if the user would like any further action to be performed or to add further additional transaction data. The user can respond in the negative.

The electronic device can transmit the additional transaction data (e.g., the transaction category and the personal memo) to the remote computing device in a message, and the remote computing device can store the data of the message in a record in a ledger with any other transaction data of the transaction. The remote computing device can generate a new ledger for the new transaction category and store the record in the new ledger. The remote computing device can transmit a message to the electronic computing device that the storage was a success. The electronic computing device can generate and present a text output indicating the transaction data and additional transaction data have been stored and a location of the storage (e.g., the ledger in which the transaction data was stored), in some embodiments in response to the confirmation message from the remote computing device. Any or all the actions performed by the electronic device can be performed by the large language model of the device (e.g., such as by executing various adapters of the large language model when necessary).

In the scenario 600, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to record the full amount for the transaction. The electronic device can respond with a question as to which transaction category to use. The user can respond with a transaction category of "Home office equipment." Responsive to the request to set the transaction category for the transaction to Home office equipment," the electronic device can record the transaction data for the transaction in a ledger for the home office equipment category, such as by storing a record of the transaction data locally in memory or by transmitting an indication of the home office equipment transaction category to the remote computing device, in some cases with the transaction or an identification of the transaction, for the remote computing device to store in a ledger for the home office equipment transaction category for the account of the transaction. The electronic device can output a request as to whether the user wishes to store additional transaction data regarding the transaction and whether the user would like to attach an image of a document (e.g., a receipt) for the transaction. The electronic device may determine to ask whether the user would like to input a receipt based on previous transactions, such as previous transactions with similar transaction data (e.g., that were performed at times within a threshold of the time of the transaction, for amounts within a threshold of the amount of the transaction, and/or at the same location), for which the user requested to input an image of a document. The previous transactions can be historical transactions, or the transaction data of the previous transactions can be historical transaction data. The historical transaction data can be account data of the account associated with the user. The electronic device can retrieve the account data from memory, query the remote computing device for account data for the account of the user, and/or query the message from the remote computing device. The user can provide an input indicating not to attach an image of the document and a description of the item purchased in the transaction.

The electronic device can transmit the additional transaction data (e.g., the transaction category and the personal memo) to the remote computing device in a message, and the remote computing device can store the data of the message in a record in a ledger (e.g., the ledger for the transaction category or a general ledger). The remote computing device can transmit a message to the electronic computing device that the storage was a success. The electronic computing device can generate and present a text output indicating the transaction data and additional transaction data have been stored and a location of the storage (e.g., the ledger in which the transaction data was stored), in some embodiments in response to the confirmation message from the remote computing device. The user can later upload an image of the receipt to the record for the transaction at the remote computing device and/or the electronic device. Any or all of the actions performed by the electronic device can be performed by the large language model of the device (e.g., such as by executing various adapters of the large language model when necessary).

In the scenario 700, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user and the electronic device can follow a similar script to the scenario 600 until the electronic device asks the user whether the user would like to provide an image of the receipt for the transaction. In the scenario 700, the user can respond in the affirmative and indicate that the receipt is multiple pages. Responsive to receiving the input from the user indicating to store images of a receipt with multiple pages, the electronic device can automatically open (e.g., via the large language model) a camera application on the electronic device and the user can use the camera application to capture images of the receipt. The electronic device can output instructions on how to capture the images. The electronic device can capture each image of the receipt (e.g., covering multiple pages of the receipt). The user can input instructions to store the images of the receipt with the transaction data of the transaction in a transaction category of Warranties (e.g., in addition to the home office equipment transaction category the user previously selected).

The electronic device can transmit the additional transaction data (e.g., the transaction categories of warranty and/or home office equipment, the personal memo, and/or the images of the receipt) to the remote computing device in a message, and the remote computing device can store the data of the message in a record in a ledger (e.g., the ledger for the one or more both of the transaction categories or a general ledger). The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all of the actions performed by the electronic device can be performed by the large language model of the device (e.g., such as by executing various adapters of the large language model when necessary).

In the scenario 800, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to record the amount for the transaction in multiple transaction categories. The electronic device can respond with a question as to which transaction categories to use and a list of transaction categories from which to choose. The electronic device can select the list of transaction categories based on account data of the account through which the transaction was performed. For example, the electronic device can identify historical transactions with similar transaction data (e.g., that were performed at times within a threshold of the time of the transaction, for amounts within a threshold of the amount of the transaction, at the same location, etc.) for which the user requested to record the amount for the transaction in multiple transaction categories. In another example, the electronic device can identify the most common transaction categories (e.g., the transaction categories with the highest counts of transactions in the respective ledgers of the transaction categories) that the user assigns to transactions. The electronic device can retrieve or determine such data by querying memory or the remote computing device for the account data. In some cases, the electronic device can determine the transaction categories to present using machine learning techniques on transaction data of the account of the user. The electronic device can present the selected list of transaction categories or at a user interface of the electronic device or otherwise play audio listing the transaction categories.

The user can provide an input indicating a transaction category from the list or another category not on the list and an amount or portion of the amount of the transaction to assign to the transaction category. The remote device can ask the user for another transaction category and an amount remaining for the transaction (e.g., the total amount for the transaction and the amount the user assigned to the transaction category). The user can respond with an indication to create a new transaction category for the remaining amount. The electronic device can request a name for the new transaction category and the user can input a name of "Charitable contributions with a receipt." In response, the electronic device can automatically assign the remaining balance to the new transaction category (e.g., store an indication that the remaining balance, or the value of the remaining balance, is assigned to the new transaction category). The electronic device can generate and present a response indicating the allocation was successful and ask the user if the user wishes to allocate any further additional transaction data (e.g., a personal memo). The user can affirmatively respond. The electronic device can generate a response requesting the additional transaction data. The user can provide the additional transaction data as input and indicate to include an image of a receipt for the transaction. The electronic device can activate the camera application on the electronic device and the user can capture an image of the receipt. The user can provide an input indicating the image is good and no further action is needed.

The electronic device can transmit the additional transaction data (e.g., the transaction categories and/or allocations of the transaction and/or the image of the receipt) to the remote computing device in a message, and the remote computing device can store the data of the message in a record in a ledger (e.g., the ledger for the one or both of the transaction categories or a general ledger). In some cases, the remote computing device can update the ledger of each transaction category indicating the allocation of the amount for the transaction. The remote computing device can create the ledger for the newly created transaction category, charitable contributions with a receipt, and update the new ledger with an amount of the transaction allocated to the new ledger (e.g., store a record in the new ledger indicating the allocated amount of the transaction to the transaction category of the ledger). The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all the actions performed by the electronic device can be performed by the large language model of the device (e.g., such as by executing various adapters of the large language model when necessary).

In the scenario 900, an electronic device (e.g., a cellular phone) of a user can receive a text (or a message through another communication protocol) indicating a transaction was performed and transaction data of the transaction. The user can respond to the text with a message to add additional context data for the transaction and the method of adding the context data. The message can include an indication of a method (e.g., voice or text) of adding the additional context data. In response to selecting the method of "voice," the electronic device can activate a chat application and the chat application can output audio data asking the user for an action to perform. The chat application can generate the request of the output audio data using a large language model such as by using the transaction data of the transaction and/or account data of an account through which the transaction was performed as input. In some embodiments, the electronic device can select the text to output as audio or text data from a stored set of text that the electronic device retrieves upon activation of the chat application.

The user can provide an input (e.g., by speaking per the selected method) to record the amount for the transaction in multiple transaction categories. The electronic device can respond with a question as to which transaction categories to use and a list of transaction categories from which to choose. The electronic device can select the transaction categories of the list as described above. The user can select a transaction category and an amount via an input. The user can also indicate to add further additional transaction data (e.g., a memo) with a description of the transaction for the transaction category. The user can also indicate to store the same amount in a second transaction category. The electronic device can store the transaction data or transmit the transaction data to the remote computing device in a record according to the input instructions from the user (e.g., store the data in the ledgers of the respective transaction categories).

The electronic device can generate and present a response requesting another transaction category with the remaining balance of the transaction and a list of the transaction categories. The list can include a custom option that the user can select to create a new transaction category. The user can provide an input indicating another transaction category, an amount to allocate to the transaction category, and further additional transaction data (e.g., a memo) with a description of the transaction for the transaction category. The electronic device can store the transaction data or transmit the transaction data to the remote computing device in a record according to the input instructions from the user (e.g., store the data in the ledgers of the respective transaction categories). The electronic device can generate and present a response asking whether the user would like to attach an image of the receipt for the transaction. The user may respond in the affirmative. The electronic device can activate a camera application on the electronic device and the user can capture an image of the receipt with the camera application. The user can input instructions to store the images of the receipt with the transaction data of the transaction and any additional transaction data the user provided.

The electronic device can transmit the additional transaction data (e.g., the transaction categories and/or allocations of the transaction and/or the image of the receipt) to the remote computing device in a message, and the remote computing device can store the data of the message in a record in a ledger (e.g., the ledger for the one or both transaction categories or a general ledger). In some cases, the remote computing device can update the ledger of each transaction category indicating the allocation of the amount for the transaction. The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all the actions performed by the electronic device can be performed by the large language model of the device (e.g., such as by executing various adapters of the large language model when necessary).

In the scenario 1000, a user can record a record of a cash payment the user made to another entity (e.g., Charity A). The user can do so through a chat application on an electronic device (e.g., a cellular phone). For example, the user can open or activate the chat application on the electronic device. The chat application can output a request for an action the user would like to perform. The user can respond with an indication of a cash payment. The chat application can ask the user who the user paid and an amount and transaction category for the payment. The user can indicate the entity that the user paid, an amount of the payment (e.g., transaction), and a transaction category of category contribution-cash out of pocket." The chat application can repeat the user's input to the user and ask the user if the user would like to add further additional transaction data (e.g., a personal memo). The user can reply in the negative. The chat application can ask the user if any further action is to be performed. The user can respond with a request to record (e.g., store) the transaction in a personal taxes folder and that is all that needs to be done.

The electronic device can transmit the transaction data (e.g., the transaction or payment amount, the transaction categories) with instructions to record the transaction in multiple ledgers (e.g., the budgeting and personal taxes folders) to the remote computing device in a message, and the remote computing device can store the data of the message according to the instructions. In some cases, the remote computing device can update the ledger of each transaction category indicating the allocation of the amount for the transaction. The remote computing device can transmit a message to the electronic computing device that the storage was a success. The electronic computing device can generate and present a text output indicating the transaction data and additional transaction data have been stored and a location of the storage (e.g., the ledger or ledgers in which the transaction data was stored), in some embodiments in response to the confirmation message from the remote computing device. Any or all the actions performed by the electronic device can be performed by the large language model of the device (e.g., such as by executing various adapters of the large language model when necessary).

Information that a user can include in an input memo (e.g., a personal memo) can include, for example, budget category selections, sharing receipt info with multiple categories, receipt image capture, digital receipt import, allocating partial receipt amounts across multiple categories, allocating transactions to individual business clients, splitting personal and business entries with separate categories for personal and business, entry "off bank" transaction info (transactions conducted via another institution or in person via cash) or personalized memos to help user remember context unique to their experience about the transaction (gifts to family members, sizes, colors, styles, etc.).

In some embodiments, a chat application as described herein can generate recommendations. For example, a user can use a computer implementing the systems and methods described herein to initiate a conversational with a chat application hosting a large language model to get real time status of their financial picture using graphs, tables, charts, and text to highlight savings levels versus goals, projections of income and fixed expenses over time, highlighting gaps where short term loans or money movement may be needed. Based on the conversational capture with personal context, the chat application and/or the remote computing device in communication with the chat application can track and predict funds needed for recurring items like subscription renewals, recurring item purchases, membership renewals, loyalty card renewal fees, tax payments, etc. The collection of this information can enable the chat application and/or the remote computing device to use category totals to be tracked over time so that real time financial projections of category impact can be made for current and future months.

In some embodiments, chat application features as described herein can be combined with real time merchant feeds to provide highly personalized push notices with purchase suggestions (e.g., with a savings benefit noted) based on their current proximity to stores, and the use of user behavior and purchase history matched to the relevant store saving promotions-enabled by personal context from the user. The chat application or the remote computing device can provide predictions each month as to how much is safe to save. The chat application or the remote computing device can also make (e.g., using machine learning techniques) predictions at a given point in time how much discretionary funds are available for a needed non-recurring purchase. The chat application or the remote computing device can provide projections for the impact of a new purchase that has an on-going term payment. The digital tracking of income and spending which is enhanced with user context, coupled with specific artificial intelligence or machine learning modules and stages of execution can enable different real time projections of financial health and recommendations for the least cost/impact options for covering any projected short fall.

In one example, prior to executing a transaction, at initiation, the chat application can generate insights regarding a general safe to spend request without impact to goals or credit, a safe to save request without impact to future required funds, or a request for a current financial position summary. These would be very specific insights based on historical and real time transactional history (including captured user unique context). In another example, the chat application can respond to a request for emergency spending of a specific amount. In response to such a request, the chat application can compare a safe to spend amount with an emergency needed amount. If there is a short fall, the chat application can initiate a second flow to determine the options for covering the shortage based on accessible savings amounts, accessible credit options and their cost, plus an analyzed impact to short- and long-term savings goals. In another example, the chat application can determine the optimum actions needed to allocate the requested funds that minimizes the cost of credit, impact to credit worthiness and impact to short- and long-term goals.

In another example, the chat application can use location, time, date, store proximity, past transactional behavior (including captured user unique context) at this proximity and a users' current financial summary to trigger personalized financial recommendations. For instance, prior to entering or while in a store. The chat application can generate recommendations based on current merchant data relative to sales and promotions. The chat application could receive and/or retrieve merchant provided information, the users current financial summary and past transactional activity at this proximity (leveraging captured user contextual data appended to prior transactions) to generate relevant personalized recommendations for taking advantage of sales and promotions of specific products and services without impacting their financial health. If there is a short fall, the chat application can generate a recommendation that includes financial products that minimize impact to financial health such as a low interest short term personal loan.

In some embodiments, a computer can use the systems and methods described herein to predict/project how 'spending' will affect the long-term budgeting goals. For example, to calculate the least financing cost and future impact on credit, the computer may need to 'know' and 'produce' features and variables that will help the computer to make accurate predictions. A prediction system that can know and produce features to make predictions is described below.

The system can include one or more artificial intelligence modules and stages. In a first stage, one or more artificial intelligence modules can predict and forecast the daily, weekly, monthly, and annual 'spending'. Stage one can provide insights on 'saving' by providing several artificial intelligence optimized routes of spending that will lead to better saving practices. As an example of these artificial intelligence optimized routes, the artificial intelligence modules can recommend and advise the user to spend less on some products or consumables. For example, based on predictions, the artificial intelligence modules can recommend the need to reduce the coffee or gas weekly spending during certain periods of time, a route to follow, that reallocates funds to support other financial areas that have a higher future need. Examples of input parameters for the stage one artificial intelligence modules can include Daily, weekly, monthly, and/or annual records for one or more of the following: Transactional data, balances and their types (checks, ATM, bill pay, cards, mobile, and/or websites), credit transaction and score, savings account(s) data, lines of credit balances and limits, user context info linked to transaction activity, added transaction activity from external aggregated sources or from conversational-smart guided input, and budget category detail and balances. Examples of an output of the stage one artificial intelligence modules can include a forecast/prediction of budget spending by category within some future time period (visualized as a table/chart/graph).

In a second stage, one or more artificial intelligence modules can predict how "desired" or "emergency spending" will impact users saving in the short and long-terms as well as the cost and options to cover short falls. The predicted impact could be generalized to measure the impact on other financial areas, such as credit scores or spending limits. The artificial intelligence modules of stage two can use the output of the artificial intelligence modules of stage one to create these impact scenarios and produce optimized spending and saving proposals.

In some embodiments, a computer can use the systems and methods described herein to generate recommendations by leveraging users' behavioral data, actions, and modelling of pattern recognition to recommend/suggest spending across budget categories to maximize savings and minimize the cost of credit. The computer can personalize and guide a user through the capture of user provided contextual data, category definitions and system interactions. In doing so, the computer can facilitate the labeling and tagging of data for use by the AI/ML system. Such methods can be directly applied to the user or be indirectly used by the business-line to enhance the user experience. Internally, business lines can provide personalized financial help in the way of specialized pre-approved loans as the recommendation system triggers real time needs.

In one example, the computer can (e.g., via the stage two artificial intelligence modules) generate a recommended tailored budget based on the outputs of the stage one artificial intelligence modules described above and the input parameters to generate the stage one artificial intelligence modules output. When emergency unplanned needs arise, using the systems and methods described herein, the computer can propose for the user money on hand that can be used, plus the optimum credit loan and payment terms that the user can afford, which may have minimum impact to the user's long-term savings and purchase goals.

In another example, the computer can provide the user with several emergency budget options and artificial intelligence optimized routes to spend the emergency budget (as well as how to pay the emergency budget off if the emergency budget was borrowed from the bank). In another example, the computer can predict the amount of emergency budget that can be available in the near future for a user and how to avoid delays in the user's long-term purchases. The computer can generate the outcome as a long-term projectile for the user's saving goals.

The computer can use the user interactions as described herein to use feedback from the user to automatically adjust the type of recommendations that the user receives (e.g., the computer can execute a large language model that has communicated with the user and/or other users to generate personalized recommendations for the user). Feedback crowd sourcing can be used to address community (e.g., a group of users) recommendations, such as via pattern recognition and similarity in which certain groups will share similar habits and interactions with the chat application hosting the large language model.

At least one aspect of a technical solution to the problems described herein is directed to a mobile electronic device. The mobile electronic device can include a network interface; and one or more processors coupled to memory. The one or more processors can be configured by machine-readable instructions to receive, from a remote computing device and via the network interface, a message comprising transaction data regarding a transaction and a request regarding activating a chat application stored in the memory, the transaction performed by a transaction card associated with an account; responsive to a user input at the electronic device, activate the chat application, wherein the chat application is configured to, upon activation: execute a large language model using the transaction data and account data associated with the account as input to generate a first string of text requesting further data regarding the transaction; present the first string of text at a chat interface of the chat application; receive, at the chat interface via a first user input, additional transaction data regarding the transaction; execute the large language model using the additional transaction data as input to generate a second string of text indicating storage of the additional data in a record at the remote computing device; and present the second string of text at the chat interface of the chat application.

In some embodiments, the one or more processors are further configured to transmit, to the remote computing device, a second message comprising the additional transaction data to the remote computing device, wherein the remote computing device stores the additional transaction data in a record of a ledger comprising one or more records of transactions performed by the transaction card. In some embodiments, the one or more processors are further configured to retrieve the account data from a database in the memory. In some embodiments, the one or more processors are further configured to receive the account data from the remote computing device. In some embodiments, the transaction data comprises a time of the transaction, a location of the transaction, and an amount of the transaction. In some embodiments, the additional transaction data of the transaction comprises a transaction category of the transaction; and wherein the one or more processors are configured to transmit a second message comprising an identification of the transaction category and an identification of the transaction to the remote computing device.

In some embodiments, the remote computing device is configured to determine the account associated with the transaction card is not associated with the transaction category from the second message; in response to the determination, generate a data structure comprising a ledger for transactions associated with the transaction category performed by the transaction card under the account; and store the transaction data of the transaction in the ledger. In some embodiments, the transaction is performed by a transaction card, and wherein the remote computing device is configured to identify the account associated with the transaction card; identify a data structure comprising a ledger for transactions associated with the transaction category performed by the transaction card under the account; and store the transaction data of the transaction in the ledger.

In some embodiments, the chat application is configured to receive the additional transaction data regarding the transaction as audio data; and execute one or more machine learning models to convert the additional transaction data into text, wherein the chat application is configured to execute the large language model using the additional transaction data as input by using the converted text of the additional transaction data as input. In some embodiments, the chat application is configured to activate a camera application stored in the memory of the mobile electronic device; receive an image of a document associated with the transaction from the camera application; receive a third user input at the chat interface indicating to store the image; execute the large language model using the third user input as input to generate a third string of text indicating the image has been stored; and present the third string of text at the chat interface of the chat application. In some embodiments, the one or more processors are further configured to transmit the image of the document to the remote computing device.

At least one aspect of a technical solution to the problems described herein is directed to a method. The method may include receiving, by one or more processors from a remote computing device, a message comprising transaction data regarding a transaction and a request regarding activating a chat application stored in memory, the transaction performed by a transaction card associated with an account; responsive to a user input, activating, by the one or more processors, the chat application; upon activation of the chat application, executing, by the one or more processors via the chat application, a large language model using the transaction data and account data associated with the account as input to generate a first string of text requesting further data regarding the transaction; presenting, by the one or more processors via the chat application, the first string of text at a chat interface of the chat application; receiving, by the one or more processors via the chat application and at the chat interface via a first user input, additional transaction data regarding the transaction; executing, by the one or more processors via the chat application, the large language model using the additional transaction data as input to generate a second string of text indicating storage of the additional data in a record at the remote computing device; and presenting, by the one or more processors via the chat application, the second string of text at the chat interface of the chat application.

In some embodiments, method further comprises transmitting, by the one or more processors to the remote computing device, a second message comprising the additional transaction data to the remote computing device, wherein the remote computing device stores the additional transaction data in a record of a ledger comprising one or more records of transactions performed by the transaction card.

The functionality described herein can be used for budgeting, goal tracking, saving, investing and personalized guidance to safely making financial purchases or investments without impacting the ability to cover their necessities or long-term savings goals.

At least one aspect of a technical solution to the problems described herein is directed to non-transitory computer-readable storage media. The non-transitory computer-readable storage media storing executable instructions that, when executed by one or more processors, cause the one or more processors to receive, from a remote computing device, a message comprising transaction data regarding a transaction and a request regarding activating a chat application, the transaction performed by a transaction card associated with an account; responsive to a user input, activate the chat application, wherein the chat application is configured to, upon activation: execute a large language model using the transaction data and account data associated with the account as input to generate a first string of text requesting further data regarding the transaction; present the first string of text at a chat interface of the chat application; receive, at the chat interface via a first user input, additional transaction data regarding the transaction; execute the large language model using the additional transaction data as input to generate a second string of text indicating storage of the additional data in a record at the remote computing device; and present the second string of text at the chat interface of the chat application.

In some embodiments, the transaction is performed by a transaction card, and wherein execution of the instructions further causes the one or more processors to transmit, to the remote computing device, a second message comprising the additional transaction data to the remote computing device, wherein the remote computing device stores the additional transaction data in a record of a ledger comprising one or more records of transactions performed by the transaction card. In some embodiments, execution of the instructions further causes the one or more processors to retrieve the account data from a database. In some embodiments, execution of the instructions further causes the one or more processors to receive the account data from the remote computing device. In some embodiments, the transaction data comprises a time of the transaction, a location of the transaction, and an amount of the transaction.

In some embodiments, the additional transaction data of the transaction comprises a transaction category of the transaction; and wherein execution of the instructions further causes the one or more processors to transmit a second message comprising an identification of the transaction category and an identification of the transaction to the remote computing device. In some embodiments, the transaction is performed by a transaction card, and wherein the remote computing device is configured to determine the account associated with the transaction card is not associated with the transaction category from the second message; in response to the determination, generate a data structure comprising a ledger for transactions associated with the transaction category performed by the transaction card under the account; and store the transaction data of the transaction in the ledger.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the remote computing device, the electronic device 104, or the POS device 106) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A mobile electronic device comprising:
   a network interface;
   one or more processors coupled to memory and configured by machine-readable instructions to:
   receive, from a remote computing device and via the network interface, a message comprising transaction data regarding a transaction and a request regarding activating a chat application stored in the memory, the transaction performed by a transaction card associated with an account;
   responsive to a user input at the electronic device, activate the chat application, wherein the chat application is configured to, upon activation:
      execute a large language model using the transaction data and account data associated with the account as input to generate a first string of text requesting further data regarding the transaction;
      present the first string of text at a chat interface of the chat application;
      receive, at the chat interface via a first user input, additional transaction data regarding the transaction;
      execute the large language model using the additional transaction data as input to generate a second string of text indicating storage of the additional data in a record at the remote computing device; and
      present the second string of text at the chat interface of the chat application.

2. The mobile electronic device of claim 1, wherein the one or more processors are further configured to:
   transmit, to the remote computing device, a second message comprising the additional transaction data to the remote computing device,
      wherein the remote computing device stores the additional transaction data in a record of a ledger comprising one or more records of transactions performed by the transaction card.

3. The mobile electronic device of claim 1, wherein the one or more processors are further configured to retrieve the account data from a database in the memory.

4. The mobile electronic device of claim 1, wherein the one or more processors are further configured to receive the account data from the remote computing device.

5. The mobile electronic device of claim 1, wherein the transaction data comprises a time of the transaction, a location of the transaction, and an amount of the transaction.

6. The mobile electronic device of claim 1, wherein the additional transaction data of the transaction comprises a transaction category of the transaction; and
   wherein the one or more processors are configured to transmit a second message comprising an identification of the transaction category and an identification of the transaction to the remote computing device.

7. The mobile electronic device of claim 6, wherein the remote computing device is configured to:
   determine the account associated with the transaction card is not associated with the transaction category from the second message;
   in response to the determination, generate a data structure comprising a ledger for transactions associated with the transaction category performed by the transaction card under the account; and
   store the transaction data of the transaction in the ledger.

8. The mobile electronic device of claim 6, wherein the remote computing device is configured to:
   identify the account associated with the transaction card;
   identify a data structure comprising a ledger for transactions associated with the transaction category performed by the transaction card under the account; and
   store the transaction data of the transaction in the ledger.

9. The mobile electronic device of claim 1, wherein the chat application is configured to:
   receive the additional transaction data regarding the transaction as audio data; and
   execute one or more machine learning models to convert the additional transaction data into text,
      wherein the chat application is configured to execute the large language model using the additional transaction data as input by using the converted text of the additional transaction data as input.

10. The mobile electronic device of claim 1, wherein the chat application is configured to:
    activate a camera application stored in the memory of the mobile electronic device;
    receive an image of a document associated with the transaction from the camera application;
    receive a third user input at the chat interface indicating to store the image;
    execute the large language model using the third user input as input to generate a third string of text indicating the image has been stored; and
    present the third string of text at the chat interface of the chat application.

11. The mobile electronic device of claim 10, wherein the one or more processors are further configured to transmit the image of the document to the remote computing device.

12. Non-transitory computer-readable storage media storing executable instructions that, when executed by one or more processors, cause the one or more processors to:
    receive, from a remote computing device, a message comprising transaction data regarding a transaction and a request regarding activating a chat application, the transaction performed by a transaction card associated with an account;
    responsive to a user input, activate the chat application, wherein the chat application is configured to, upon activation:
       execute a large language model using the transaction data and account data associated with the account as input to generate a first string of text requesting further data regarding the transaction;
       present the first string of text at a chat interface of the chat application;

receive, at the chat interface via a first user input, additional transaction data regarding the transaction;

execute the large language model using the additional transaction data as input to generate a second string of text indicating storage of the additional data in a record at the remote computing device; and present the second string of text at the chat interface of the chat application.

13. The non-transitory computer-readable storage media of claim 12, wherein execution of the instructions further causes the one or more processors to:

transmit, to the remote computing device, a second message comprising the additional transaction data to the remote computing device, wherein the remote computing device stores the additional transaction data in a record of a ledger comprising one or more records of transactions performed by the transaction card.

14. The non-transitory computer-readable storage media of claim 12, wherein execution of the instructions further causes the one or more processors to retrieve the account data from a database.

15. The non-transitory computer-readable storage media of claim 12, wherein execution of the instructions further causes the one or more processors to receive the account data from the remote computing device.

16. The non-transitory computer-readable storage media of claim 12, wherein the transaction data comprises a time of the transaction, a location of the transaction, and an amount of the transaction.

17. The non-transitory computer-readable storage media of claim 12, wherein the additional transaction data of the transaction comprises a transaction category of the transaction; and wherein execution of the instructions further causes the one or more processors to transmit a second message comprising an identification of the transaction category and an identification of the transaction to the remote computing device.

18. The non-transitory computer-readable storage media of claim 17, wherein the remote computing device is configured to:

determine the account associated with the transaction card is not associated with the transaction category from the second message;

in response to the determination, generate a data structure comprising a ledger for transactions associated with the transaction category performed by the transaction card under the account; and store the transaction data of the transaction in the ledger.

19. A method comprising:

receiving, by one or more processors from a remote computing device, a message comprising transaction data regarding a transaction and a request regarding activating a chat application stored in memory, the transaction performed by a transaction card associated with an account;

responsive to a user input, activating, by the one or more processors, the chat application;

upon activation of the chat application, executing, by the one or more processors via the chat application, a large language model using the transaction data and account data associated with the account as input to generate a first string of text requesting further data regarding the transaction;

presenting, by the one or more processors via the chat application, the first string of text at a chat interface of the chat application;

receiving, by the one or more processors via the chat application and at the chat interface via a first user input, additional transaction data regarding the transaction;

executing, by the one or more processors via the chat application, the large language model using the additional transaction data as input to generate a second string of text indicating storage of the additional data in a record at the remote computing device; and presenting, by the one or more processors via the chat application, the second string of text at the chat interface of the chat application.

20. The method of claim 19, further comprising:

transmitting, by the one or more processors to the remote computing device, a second message comprising the additional transaction data to the remote computing device, wherein the remote computing device stores the additional transaction data in a record of a ledger comprising one or more records of transactions performed by the transaction card.

* * * * *